(12) United States Patent
Matsunaga

(10) Patent No.: US 10,732,278 B2
(45) Date of Patent: Aug. 4, 2020

(54) POSITION DETECTION SYSTEM

(71) Applicant: DENSO CORPORATION, Kariya, Aichi-pref. (JP)

(72) Inventor: Takayuki Matsunaga, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/412,890

(22) Filed: May 15, 2019

(65) Prior Publication Data

US 2019/0265352 A1 Aug. 29, 2019

Related U.S. Application Data

(63) Continuation of application No. PCT/JP2017/033615, filed on Sep. 18, 2017.

(30) Foreign Application Priority Data

Nov. 30, 2016 (JP) .................................. 2016-232952

(51) Int. Cl.
*G01S 15/04* (2006.01)
*E04H 6/08* (2006.01)
(Continued)

(52) U.S. Cl.
CPC ................ *G01S 15/04* (2013.01); *E04H 6/08* (2013.01); *E04H 6/18* (2013.01); *E04H 6/42* (2013.01); *G01S 7/006* (2013.01); *G01S 15/325* (2013.01); *G01S 15/87* (2013.01); *G01S 15/42* (2013.01); *G08G 1/14* (2013.01)

(58) Field of Classification Search
CPC ........ G01S 15/04; G01S 15/87; G01S 15/325; G01S 7/006; G01S 15/42; E04H 6/18; E04H 6/08; E04H 6/42–426; G08G 1/14; G08G 1/04; G08G 1/005; G08G 1/146; G08G 1/142; G08G 1/205
See application file for complete search history.

(56) References Cited

U.S. PATENT DOCUMENTS

| 6,407,698 | B1 * | 6/2002 | Ayed ....................... G01S 1/047 342/357.31 |
| 2003/0092387 | A1 * | 5/2003 | Hjelmvik ............. G06Q 20/127 455/41.1 |

(Continued)

FOREIGN PATENT DOCUMENTS

| DE | 102009023838 B3 | 1/2011 |
| JP | 2006120022 A | 5/2006 |

(Continued)

*Primary Examiner* — Ryan W Sherwin
(74) *Attorney, Agent, or Firm* — Harness, Dickey & Pierce, P.L.C.

(57) ABSTRACT

A position detection system is provided as including (i) a sound wave apparatus in a predetermined designated area and (ii) a detection terminal. The sound wave apparatus transmits a sound wave on which position information including a position of its own is superimposed as a detection sound wave. The detection terminal receives the detection sound wave, acquires the position information superimposed on the received detection sound wave, and stores the acquired position information as information indicating the position of the designated area.

10 Claims, 8 Drawing Sheets

(51) Int. Cl.
  *G01S 7/00* (2006.01)
  *G01S 15/32* (2006.01)
  *G01S 15/87* (2006.01)
  *E04H 6/42* (2006.01)
  *E04H 6/18* (2006.01)
  G08G 1/14 (2006.01)
  G01S 15/42 (2006.01)

(56) References Cited

U.S. PATENT DOCUMENTS

| | | | |
|---|---|---|---|
| 2010/0085214 A1* | 4/2010 | Kim | G08G 1/14 |
| | | | 340/932.2 |
| 2010/0161209 A1* | 6/2010 | Vaghefinazari | G01C 21/3632 |
| | | | 701/533 |
| 2015/0177362 A1* | 6/2015 | Gutierrez | B60R 25/245 |
| | | | 701/519 |
| 2015/0221139 A1* | 8/2015 | Bogaard | G06Q 20/102 |
| | | | 705/13 |
| 2016/0019775 A1* | 1/2016 | Fokkelman | H04B 5/0062 |
| | | | 340/539.32 |
| 2016/0163121 A1* | 6/2016 | Martin | G06Q 10/02 |
| | | | 705/13 |
| 2017/0148324 A1* | 5/2017 | High | G06K 9/00771 |
| 2018/0190117 A1* | 7/2018 | Longardner | G08G 1/142 |

FOREIGN PATENT DOCUMENTS

| | | |
|---|---|---|
| JP | 2014035553 A | 2/2014 |
| JP | 2015194926 A | 11/2015 |
| JP | 2016012290 A | 1/2016 |
| JP | 2016099885 A | 5/2016 |

\* cited by examiner

POSITION DETECTION SYSTEM

CROSS REFERENCE TO RELATED APPLICATIONS

The present application is a continuation application of International Patent Application No. PCT/JP2017/033615 filed on Sep. 18, 2017, which designated the United States and claims the benefit of priority from Japanese Patent Application No. 2016-232952 filed on Nov. 30, 2016. The entire disclosures of all of the above applications are incorporated herein by reference.

TECHNICAL FIELD

The present disclosure relates to a technique for detecting a position.

BACKGROUND

There is conventionally known a technique for detecting a position using a GPS (Global Positioning System); however, it is difficult to use GPS, for example, underground, indoors, and the like. In such a place where it is difficult to use the GPS, there are proposed various techniques for detecting the position.

For example, a technique is proposed which requires a terminal held by a user to read a contactless tag installed in a parking lot for detecting information indicating the parking position stored in the contactless tag.

SUMMARY

According to an example of the present disclosure, a position detection system is provided as including (i) a sound wave apparatus in a predetermined designated area and (ii) a detection terminal. The sound wave apparatus transmits a sound wave on which position information including a position of its own is superimposed as a detection sound wave. The detection terminal receives the detection sound wave, acquires the position information superimposed on the received detection sound wave, and stores the acquired position information as information indicating the position of the designated area.

BRIEF DESCRIPTION OF THE DRAWINGS

The above and other objects, features and advantages of the present disclosure will become more apparent from the following detailed description made with reference to the accompanying drawings.

DETAILED DESCRIPTION

Embodiments of the present disclosure will be described below with reference to the drawings.

1. First Embodiment

1-1. Configuration

Figure 1:
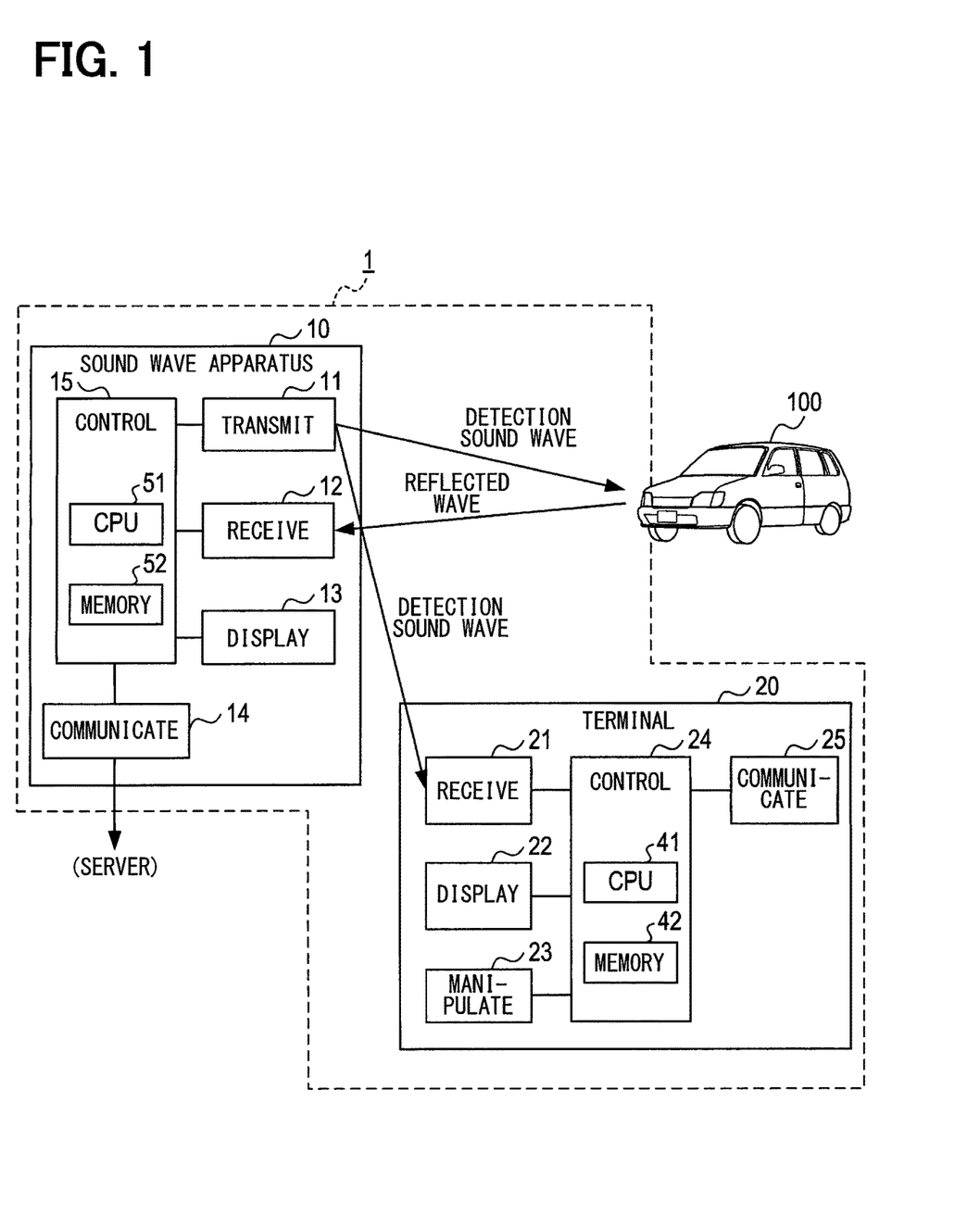
FIG. 1 is a block diagram showing a configuration of a position detection system, a sound wave apparatus, and an information terminal according to a first embodiment.

FIG. 1 illustrates a position detection system 1 that detects the position of each parking stall in a parking lot provided underground. The parking stall mentioned here is an area where a vehicle 100 can be parked. Hereinafter, the area in which a single vehicle 100 is enabled to be parked is referred to as a parking stall or a single-vehicle parking space.

The position detection system 1 includes a sound wave apparatus 10 and an information terminal 20. The sound wave apparatus 10 is configured to transmit a detection sound wave, which will be described later, towards at least inside of the parking stall. The information terminal 20 is configured to receive the detection sound wave transmitted from the sound wave apparatus 10.

1-1-1. Sound Wave Apparatus

The sound wave apparatus 10 is installed in a predetermined designated area. The designated area refers to one of a plurality of areas in a place, such as an underground or an inside of a building, where it is difficult to receive radio waves for position detection such as GPS. The present embodiment will give a description on the assumption that the designated area includes a parking stall in the above-mentioned underground parking lot.

Figure 2:
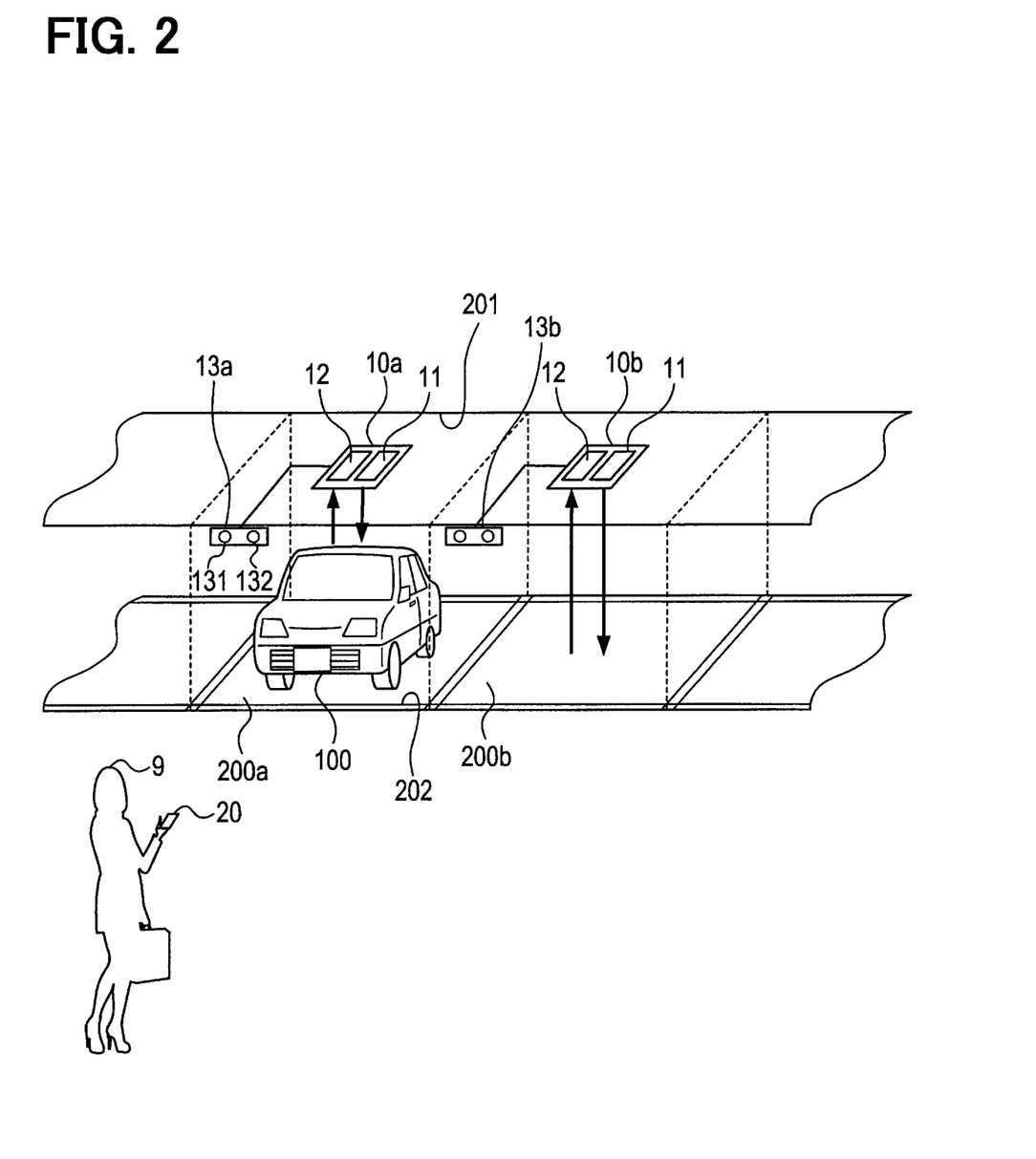
FIG. 2 is a diagram for explaining a position of a sound wave apparatus.

Specifically, as shown in FIG. 2, the sound wave apparatus 10 is installed at an upper spot in a parking stall 200, such as in a ceiling 201 in the parking stall 200, for instance. As shown in FIG. 2, the sound wave apparatuses 10 are installed for the respective parking stalls 200, such that a sound wave apparatus 10*a* is installed in a parking stall 200*a* whereas a sound wave apparatus 10*b* is installed in a parking stall 200*b*, for instance.

In the following description, when describing each of the configurations, for example, as in the sound wave apparatus 10*a*, the suffix is attached; when describing the contents common to each of the configurations, for example, as in the sound wave apparatus 10, the suffix is abbreviated.

The present embodiment will describe an example in which the position detection system 1 includes a plurality of sound wave apparatuses 10*a* to 10*b* and a single information terminal 20. However, the number of the sound wave apparatuses 10 and the number of the information terminals 20 in the position detection system 1 each are not limited thereto. The position detection system 1 may include at least one sound wave apparatus 10 and at least one information terminal 20.

Returning to FIG. 1, the description will be continued. The sound wave apparatus 10 includes an apparatus transmitter 11, an apparatus receiver 12, an apparatus display 13, an apparatus communicator 14, and an apparatus controller 15.

The apparatus transmitter 11, which includes at least a speaker (not shown), generates a detection sound wave, and transmits the generated detection sound wave to an outside of the sound wave apparatus 10. In addition, the apparatus transmitter 11 is configured to execute or stop transmission of the detection sound wave in accordance with an instruction from the apparatus controller 15.

The detection sound wave is a sound wave which has a predetermined frequency which is audible or inaudible; the sound wave is superimposed with position information outputted from the apparatus controller 15. The position information will be described later. In the present embodiment, an inaudible sound wave of about a dozen of kHz to several dozens of kHz is used as a detection sound wave. Note that "information" is used not only as an uncountable noun but also as a countable noun and is thus equivalent to an information item. One information is equivalent to one information item: a plurality of information(s) are equivalent to a plurality of information items.

Here, the term "position information is superimposed" signifies that a sound wave of the above-mentioned predetermined frequency is modulated by a predetermined modulation method such as FSK modulation, ASK modulation or the like, to be a data string of "1", "0" representing position information. In the present embodiment, the apparatus transmitter 11 generates a sound wave of a predetermined frequency, the sound wave being FSK-modulated by a data string of "1", "0" representing position information, as a detection sound wave. Note that without need to be limited thereto, other modulation schemes such as ASK modulation can be used when position information is superimposed on a sound wave.

The apparatus transmitter 11 is configured to transmit a detection sound wave at least inside of the parking stall 200. Specifically, in the apparatus transmitter 11, the directivity of the speaker is set so as to transmit a sound wave within a predetermined angle range centered on the transmission direction. The angle range may be set according to predetermined various conditions.

As shown in FIG. 2, the transmission direction is, inside of the parking stall 200, a direction from a spot of the ceiling 201 where the sound wave apparatus 10 is installed towards a spot of the floor 202 which the spot of the ceiling 201 faces perpendicularly. FIG. 2 illustrates the transmission direction of the sound wave apparatus 10b in the parking stall 200b. In this way, the apparatus transmitter 11 transmits detection sound waves towards at least the inside of the parking stall 200.

The apparatus receiver 12, which includes at least a microphone (not shown), receives the reflected wave of the detection sound wave transmitted from the apparatus transmitter 11, and outputs it to the apparatus controller 15. The term "reflected wave" as used herein refers to a reflected wave from the outside of the sound wave apparatus 10. That is, when the vehicle 100 is parked in the parking stall 200a like in FIG. 2, the sound wave apparatus 10a receives the reflected wave reflected by the vehicle 100. Further, when the vehicle 100 is not parked in the parking stall 200b like in FIG. 2, the sound wave apparatus 10b receives the reflected wave reflected on the floor 202 in the parking stall 200b.

Returning to FIG. 1, the description will be continued. The apparatus controller 15 is also referred to as an apparatus electronic control unit, or an apparatus electronic control circuit. In the present application, as one of the examples, the apparatus controller 15 is mainly configured to include a well-known microcomputer having a CPU 51 and a semiconductor memory (hereinafter referred to as a memory 52) such as a RAM, a ROM, and a flash memory.

Various functions of the apparatus controller 15 are realized by the CPU 51 executing a program stored in a non-transitory tangible storage medium. In this example, the memory 52 corresponds to a non-transitory tangible storage medium for storing a program. With the execution of the program, a method corresponding to the program is executed. The number of microcomputers included in the apparatus controller 15 may be one or more.

Figure 3:
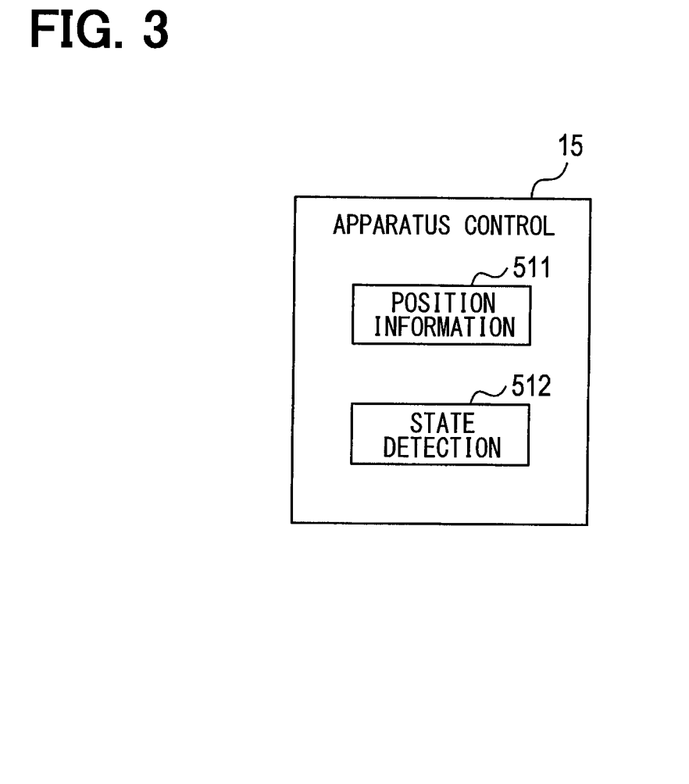
FIG. 3 is a block diagram showing functions of an apparatus controller.

As shown in FIG. 3, the apparatus controller 15 providing a plurality of functions includes a position information unit 511 (which may also be referred to as a position information section 511) and a state detection unit 512 (which may also be referred to as a state detection section 512), as elements of respective functions. For instance, as mentioned above, as one of the examples of the present disclosure, the respective sections or units may be realized by the CPU 51 executing a program. A method of realizing these elements included in the apparatus controller 15 is not limited to software, and some or all of the elements may be realized by using one or more hardware circuits. For another example, when the above functions are implemented by an electronic circuit that is hardware, the electronic circuit may be implemented by a digital circuit that includes a large number of logic circuits, an analog circuit, or a combination of the digital circuit and the analog circuit.

The position information unit 511 generates position information and outputs it to the apparatus transmitter 11. The position information is information including the position of the sound wave apparatus 10. In the present embodiment, a stall number, which is a predetermined number for each parking stall 200, is attached, and the stall number is used as information indicating the position of the sound wave apparatus 10. The information indicating the position of the sound wave apparatus 10 as described above is stored in the memory 52 in advance.

Note that there is no need to be limited thereto. The position of the sound wave apparatus 10 may be represented in various manners as follows: latitude and longitude; a combination of (i) one of floors and (ii) a number assigned to one of the parking stalls for each floor such as what number on which floor in the parking lot; or a combination of the position of an entrance and the direction from the entrance to the sound wave apparatus 10. In the sound wave apparatus 10, the identification information capable of identifying a corresponding one of the sound wave apparatuses 10 may be stored in advance in the memory 52, or the identification information may be included in the position information.

The state detection unit 512 detects whether or not the parking stall is in an empty state by executing a state detection process to be described later. In accordance with an instruction from the apparatus controller 15, the apparatus display 13 performs a display according to the detection result such as whether or not the parking stall 200 is in the empty state.

In the present embodiment, the apparatus display 13 includes a green LED 131 and a red LED 132. In accordance with an instruction from the apparatus controller 15, the apparatus display 13 turns on the green LED 131 when the parking stall 200 is in the empty state, and turns on the red LED 132 when it is not in the empty state.

Here, the fact that the parking stall 200 is in the empty state signifies that the vehicle is not parked in the parking stall 200 as in the parking stall 200b in FIG. 2. On the other hand, the fact that the parking stall 200 is not in the empty state signifies that the vehicle 100 is parked in the parking stall 200 and the parking stall 200 is in use, as in the parking stall 200a in FIG. 2.

Without need to be limited thereto, the apparatus display 13 may be configured to display whether or not it is empty according to a mode which can be distinguished visually, a pattern, a color, or a character such as "vehicle present" and "vehicle absent".

The apparatus communicator 14 is connected to a server (not shown) via a communication line (not shown), and transmits the detection information output from the apparatus controller 15 to the server. In the present embodiment, the apparatus controller 15 outputs detection information including (i) identification information capable of identifying the corresponding sound wave apparatus 10 from any other sound wave apparatuses 10 and (ii) information indicating whether or not the corresponding parking stall 200 where the sound wave apparatus 10 is installed is in the empty state; the outputted detection information is transmitted via the apparatus communicator 14.

The server may be configured to manage an empty situation throughout the parking lot based on the detection information transmitted from each of the sound wave apparatuses 10.

1-1-2. Information Terminal

Next, the configuration of the information terminal 20 will be described. The information terminal 20, which is a movable apparatus capable of receiving sound waves, can be carried by a user 9, as shown in FIG. 2. The information terminal 20 is embodied by, for example, a high-function mobile phone called a smartphone or the like. The user 9 may include a driver or occupant of a vehicle parked in the parking stall 200, a person who is moving near the parking stall 200, or the like.

The information terminal 20 includes a terminal receiver 21, a terminal display 22, a manipulator 23, a terminal controller 24, and a terminal communicator 25.

The terminal receiver 21 includes at least a microphone (not shown) to receive sound waves, which include the aforementioned detection sound wave. The terminal receiver 21 receives the detection sound wave transmitted from the sound wave apparatus 10 and demodulates it to output a signal representing the position information superimposed on the detection sound wave to the terminal controller 24.

The manipulator 23 receives a manipulation by the user 9 carrying the information terminal 20. The terminal communicator 25 performs wireless communication with another information terminal 20. Terminal controller 24 is also referred to as a terminal electronic control unit, a terminal electronic control circuit. In the present application, as one of the examples, the terminal controller 24 is mainly configured to include a well-known microcomputer having a CPU 41 and a semiconductor memory (hereinafter referred to as a memory 42) such as a RAM, a ROM, and a flash memory. Various functions of the terminal controller 24 are realized by the CPU 41 executing a program stored in a non-transitory tangible storage medium. In this example, the memory 42 corresponds to a non-transitory tangible storage medium for storing a program. With the execution of the program, a method corresponding to the program is executed. The number of microcomputers included in the terminal controller 24 may be one or more.

Figure 4:
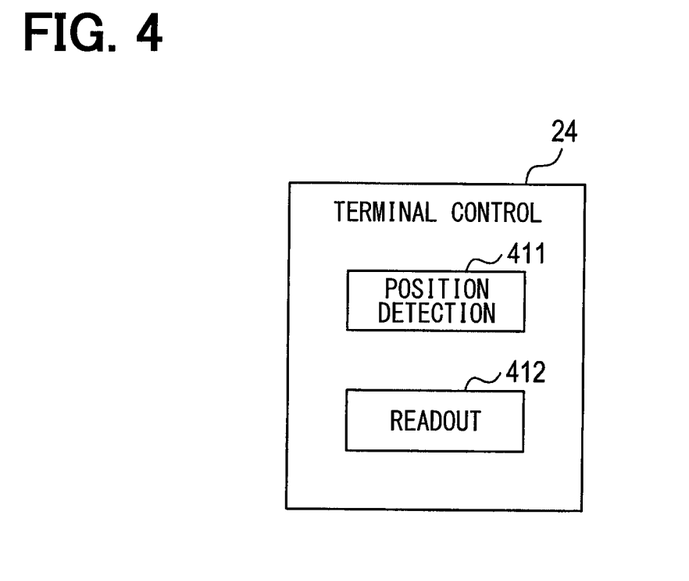
FIG. 4 is a block diagram showing functions of a terminal controller.

As shown in FIG. 4, the terminal controller 24 providing a plurality of functions includes a position detection unit 411 (which may also be referred to as a position detection section 411) and a readout unit 412 (which may also be referred to as a readout section 412), as elements of respective functions. For instance, as mentioned above, as one of the examples of the present disclosure, the respective sections or units may be realized by the CPU 41 executing a program. The method of realizing these elements included in the terminal controller 24 is not limited to software, and some or all of the elements may be realized by using one or more hardware circuits. For another example, when the above functions are implemented by an electronic circuit that is hardware, the electronic circuit may be implemented by a digital circuit that includes a large number of logic circuits, an analog circuit, or a combination of the digital circuit and the analog circuit.

In response to that the user 9 manipulates the manipulator 23 to actuate the position detection unit 411, the position detection unit 411 executes a position detection process to be described later, receives the detection sound wave transmitted from the sound wave apparatus 10, and acquires (extracts) the position information superimposed on the detection sound wave to store it in the memory 42.

In response to that the user 9 manipulates the manipulator 23 to actuate the readout unit 412, the readout unit 412 reads the position information stored in the memory 42, and displays the position information on the terminal display 22.

The terminal display 22 includes a display screen for displaying an image. The terminal display 22 displays an image representing the position information on the display screen in accordance with an instruction from the terminal controller 24.

1-2. Processes

The following will describe a state detection process executed by the apparatus controller 15 in the sound wave apparatus 10, (i.e., the CPU 51, more specifically, the state detection unit 512). In addition, a position detection process will be described which is executed by the terminal controller 24 in the information terminal 20 (i.e., the CPU 41, specifically, the position detection unit 411).

The described flowcharts in the present disclosure each include a plurality of sections (also referred to as steps) executed by the apparatus controller 15 or the terminal controller 24; each section is represented, for instance, as S10 or S110. Further, each section may be divided into several subsections, while several sections may be combined into one section. Each section (e.g., detection section) may be also referred to as a device (e.g., detection device), a unit (e.g., detection unit), a processor (e.g., detection processor), or a unique name (e.g., detector) with or without a structural modifier. Also, the section may be achieved as (i) a software section in combination with a hardware unit (e.g., computer) or (ii) a hardware section (e.g., an integrated circuit or a wired logic circuit), including or not including a function of a related apparatus. Furthermore, the hardware section may be constructed inside of a microcomputer.

1-2-1. State Detection Process

Figure 5:
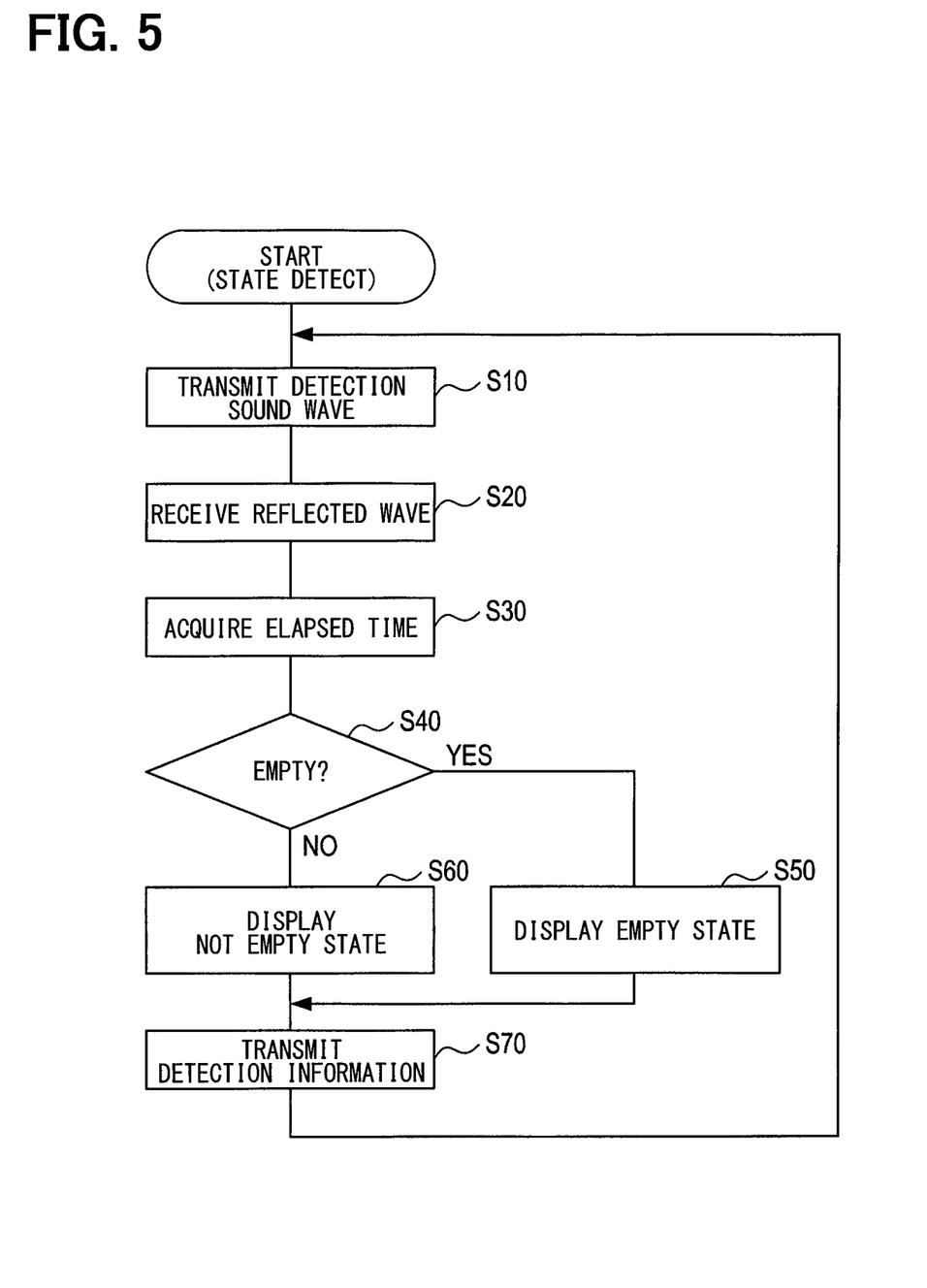
FIG. 5 is a flowchart of a state detection process.

First, the state detection process executed by the apparatus controller 15 in the sound wave apparatus 10 will be described with reference to the flowchart of FIG. 5.

The state detection process is a process of causing the apparatus transmitter 11 to transmit the detection sound wave to the outside and detecting whether or not the parking stall 200 where the sound wave apparatus 10 is installed is in the empty state based on the elapsed time. The elapsed time referred to here is a period of time from when the detection sound wave is transmitted until when the reflected wave is received by the apparatus receiver 12. The state detection process is executed for each transmission cycle which is predetermined. The transmission cycle is set to a predetermined period of time and is stored in advance in the memory 52. The transmission cycle may be set, for example, to a period of time of about 1/10 second to several seconds.

In S10, the apparatus controller 15 outputs an instruction instructing the apparatus transmitter 11 to transmit the detection sound wave. In S20, the apparatus controller 15 receives the reflected wave of the detection sound wave transmitted in S10 via the apparatus receiver 12.

The apparatus controller 15 acquires the elapsed time in S30. In the present embodiment, the elapsed time is calculated in a different process in the apparatus controller 15. In S30, the apparatus controller 15 is configured to acquire the elapsed time calculated in the different process. Without need to be limited thereto, the apparatus controller 15 may be configured to calculate, in S30, the elapsed time on the basis of the time at which the detection sound wave is transmitted at S10 and the time at which the reflected wave is received at S20.

In S40, the apparatus controller 15 determines whether or not the parking stall 200 is in the empty state. Specifically, when the elapsed time is equal to or greater than a predetermined time threshold value, the apparatus controller 15 stores in advance, in the memory 52, the time threshold value for determining that the parking stall 200 is in the empty state. The time threshold value may be set to a value larger than the elapsed time acquired when the vehicle 100 is parked in the parking stall 200a as shown in FIG. 2. Simultaneously, the time threshold value may be set to a value smaller than the elapsed time acquired when any vehicle 100 is not parked in the parking stall 200b as shown in FIG. 2.

When the parking stall 200 is in the empty state, the apparatus controller 15 shifts the sequence to S50; when it is not in the empty state, it shifts the sequence to S60. In S50, the apparatus controller 15 causes the apparatus display 13 to display a message indicating that the parking stall 200 is in the empty state. In the present embodiment, the apparatus controller 15 outputs an instruction for lighting up the green LED 131 to the apparatus display 13. As a result, the apparatus display 13 turns on the green LED 131 to indicate that the parking stall 200 is in the empty state.

In S60, the apparatus controller 15 causes the apparatus display 13 to display a message indicating that the parking stall 200 is not in the empty state. In the present embodiment, the apparatus controller 15 outputs an instruction for turning on the red LED 132 to the apparatus display 13. As a result, the apparatus display 13 turns on the red LED 132 to indicate that the parking section 200 is not in the empty state.

In S70, the apparatus controller 15 outputs the detection information to the server via the communication line. As described above, the detection information is information including (i) identification information of the sound wave apparatus 10 and (ii) information indicating whether or not the parking stall 200 where the sound wave apparatus 10 is installed is in the empty state. For example, when it is determined that it is in the empty state in S40, (i) the identification information of the sound wave apparatus 10 and (ii) the information indicating that the parking stall 200 where the sound wave apparatus 10 is installed is in the empty state are output as detection information.

After outputting the detection information, the apparatus controller 15 outputs an instruction instructing the apparatus transmitter 11 to stop the transmission of the detection sound wave, and ends the present state detection process.

1-2-2. Position Detection Process

Figure 6:
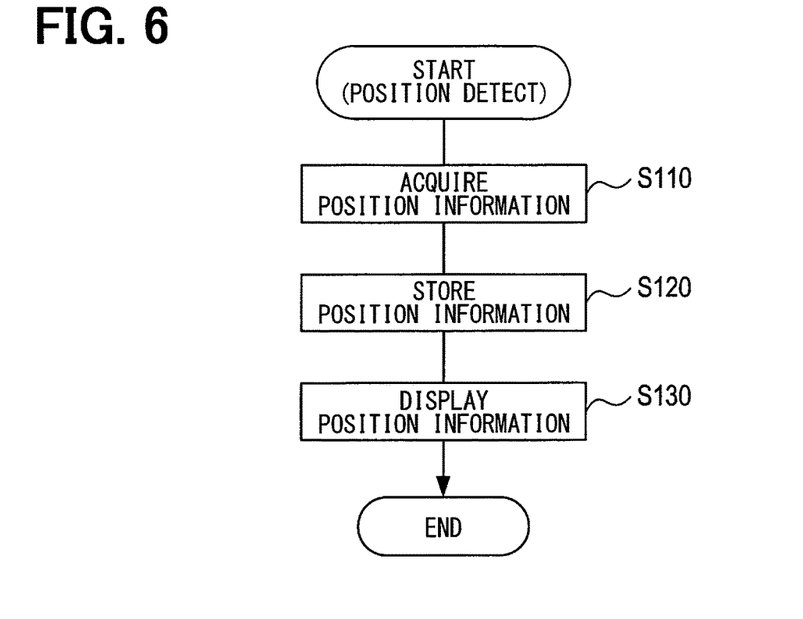
FIG. 6 is a flowchart of a position detection process.

Next, the position detection process executed by the terminal controller 24 in the information terminal 20 will be described with reference to the flowchart of FIG. 6. The position detection process is started with the manipulator 23 receiving a manipulation to execute the position detection process from the user 9 of the information terminal 20 as a trigger.

In S110, the terminal controller 24 receives the detection sound wave transmitted from the sound wave apparatus 10 via the terminal receiver 21, and acquires (extracts) the position information superimposed on the received detection sound wave. In S120, the terminal controller 24 stores the position information acquired (extracted) in S110 in the memory 42 as information indicating the position of the parking stall 200 where the sound wave apparatus 10 is installed. In the present embodiment, as described above, since the stall number is included in the position information as information indicating the position of the sound wave apparatus 10 (i.e., the position of the parking stall 200), the stall number is stored in the memory 42.

In S130, the terminal controller 24 causes the terminal display 22 to display the position information acquired (extracted) in S110. In the present embodiment, the position information acquired (extracted) in S110 is stored in the memory 42, and the stall number included in the position information stored in the memory 42 is displayed on the terminal display 22. The terminal controller 24 displays the position information on the terminal display 22, and then ends the present position detection process.

In the present embodiment, the stall number of the parking stall 200 is included in the position information, and the stall number is displayed on the terminal display 22. There is no need to be limited thereto. The position information may be stored in various modes as described above; in S130, the information in accordance with the mode may be displayed.

1-2-3. Operation

The position detection system 1 configured as described above operates as follows.

(1) The sound wave apparatus 10 installed in a parking stall 200 repeatedly transmits a detection sound wave at each transmission cycle. Then, the sound wave apparatus 10 determines whether the parking stall 200 is in the empty state based on the elapsed time. When the parking stall 200 is in the empty state, for example, the green LED 131 is turned on, to display the information indicating that it is in the empty state.

(2) When the user 9 parks a vehicle in the parking stall 200 of which the empty state is displayed, the sound wave apparatus 10 installed in the parking stall 200 detects that the elapsed time is less than the time threshold value and determines that the parking stall 200 is not in the empty state. Then, the sound wave apparatus 10 makes a display indicating that it is not in the empty state, for example, to turn on the red LED 132. Further, the sound wave apparatus 10 transmits the detection information to the server.

(3) When a user 9 who has parked a vehicle in a parking stall 200 performs a manipulation of causing the information terminal 20 carried by the user 9 to perform the position detection process in the parking stall 200, the position detection process is started in the information terminal 20. The information terminal 20 receives the detection sound wave transmitted from the sound wave apparatus 10 installed in the parking stall 200, acquires (extracts) the position information superimposed on the detection sound wave, stores the acquired position information in the memory 42, and displays it on the terminal display 22.

(4) The user 9 can easily detect the position of the parking stall 200 where the vehicle of the user 9 is parked based on the position information displayed on the information terminal 20. In addition, the information terminal 20 stores the position information. Even if the user 9 carries the information terminal 20 and moves from the parking stall 200, the user 9 can easily return to the parking stall 200 based on the position information stored in the information terminal 20.

1-3. Effects

According to the embodiment detailed above, the following effects may be provided.

(1a) The position detection system 1 includes a sound wave apparatus 10 and an information terminal 20. The sound wave apparatus 10 includes an apparatus controller 15 and an apparatus transmitter 11 which are installed in a predetermined parking stall 200. In the apparatus controller 15, the position information unit 151 acquires and stores position information which is information including the position of the sound wave apparatus 10. The apparatus transmitter 11 transmits the sound wave on which the position information is superimposed as a detection sound wave.

The information terminal 20 includes a detection receiver 21 and a terminal controller 24. The detection receiver 21 receives the detection sound wave. In S120, the terminal controller 24 acquires (extracts) the position information superimposed on the received detection sound wave. In addition, in S130, the terminal controller 24 stores the acquired (extracted) position information in the memory 42 as information indicating the position of the parking stall 200.

According thereto, the user 9 can easily detect the position of the parking stall 200 using the information terminal 20 without the user 9 required to do a troublesome work of holding the terminal over a contactless tag as in a conventional technique.

In addition, according thereto, since information indicating the position of the parking stall 200 is stored in the information terminal 20, the user 9 can appropriately read information indicating the position of the parking stall 200. That is, even if the user 9 moves away from the parking stall 200, information indicating the position of the parking stall 200 is stored in the information terminal 20. Therefore, by carrying the information terminal 20, the user 9 can return from a place after moving from the parking stall 200 to the parking stall 200 without hesitation. An effect is particularly exhibited especially in a large parking lot accommodates a large number of parking stalls 200, for instance.

(1b) In the sound wave apparatus 10, the apparatus transmitter 11 is configured to transmit detection sound waves at least to the inside of the parking stall 200. The apparatus receiver 12 receives the reflected wave of the detection sound wave. The apparatus controller 15 acquires an elapsed time that is a period of time from the transmission of the detection sound wave to the reception of the reflected wave. When the elapsed time is equal to or greater than a predetermined time threshold value, it is detected that the parking stall 200 is in the empty state.

According thereto, it is possible to detect whether or not the parking stall 200 is in the empty state by using the detection sound wave.

(1c) In the information terminal 20, the terminal controller 24 displays an image representing the position information on the terminal display 22 based on the information indicating the position of the parking stall 200 stored in the memory 42 in S130. According thereto, the user 9 of the information terminal 20 can visually recognize the position information.

(1d) The information terminal 20 is configured to be carried by a user using the information terminal 20, that is, the user 9. According thereto, the information terminal 20 is carried by the user 9; even if moving from the parking stall 200, the user 9 can return to the parking stall 200 based on the position information stored in the information terminal 20 without hesitation.

2. Second Embodiment 2-1. Difference from First Embodiment

The basic configuration of a second embodiment is similar to the first embodiment; the difference will be described below. Note that the same reference signs as those in the first embodiment indicate the same configuration, and refer to the preceding descriptions.

In the first embodiment described above, the sound wave apparatus 10 includes one apparatus transmitter 11. On the other hand, the second embodiment is different from the first embodiment in that the sound wave apparatus 10 includes a plurality of apparatus transmitters.

2-2. Configuration

Figure 7:
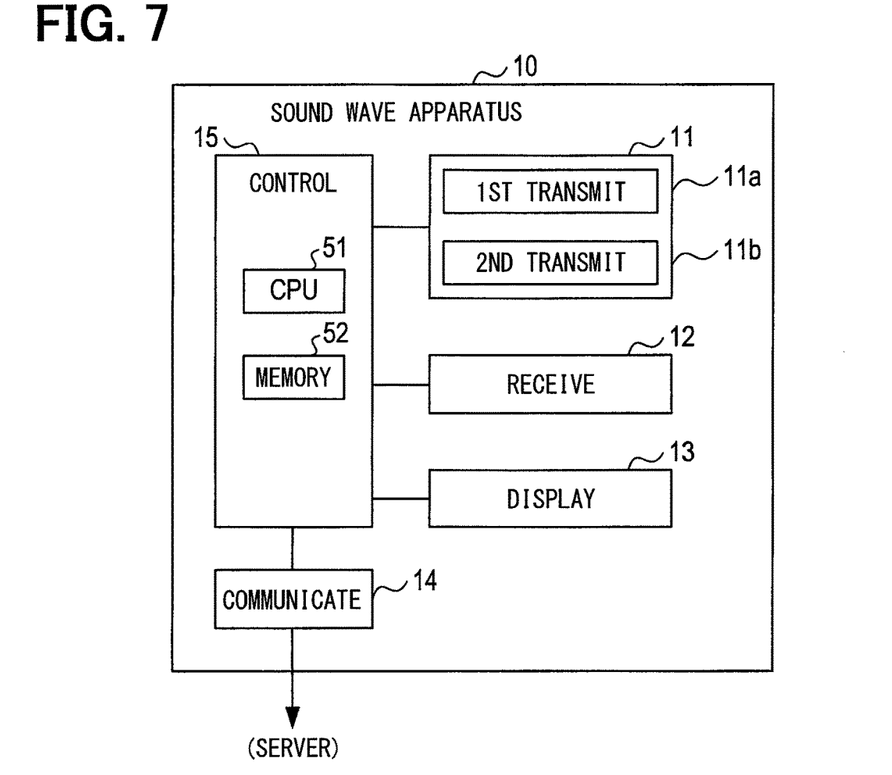
FIG. 7 is a block diagram showing a configuration of a sound wave apparatus according to a second embodiment.

As shown in FIG. 7, in the present embodiment, the sound wave apparatus 10 includes a first apparatus transmitter 11a and a second apparatus transmitter 11b.

Figure 8:
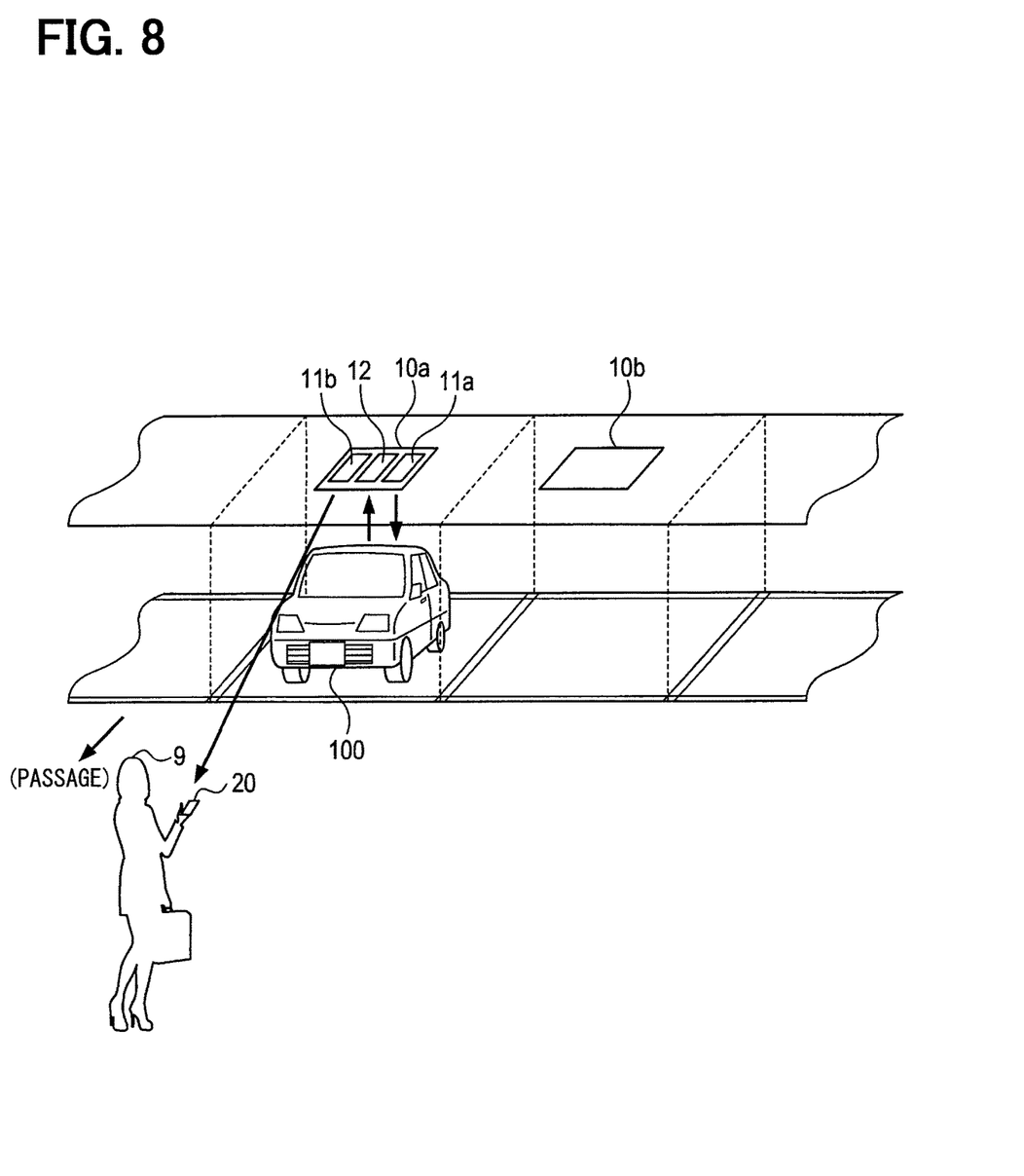
FIG. 8 is a diagram for explaining operations of a sound wave apparatus according to the second embodiment.

As shown in FIG. 8, the first apparatus transmitter 11a is configured to transmit a detection sound wave into the inside of the parking stall 200. The first apparatus transmitter 11a is provided like the apparatus transmitter 11 in the first embodiment. Specifically, a speaker is set so as to provide, in a parking stall 200, a transmission direction from a spot of the ceiling 201 where the sound wave apparatus 10 is installed towards a spot of the floor 202 which the spot of the ceiling 201 faces perpendicularly; the speaker transmits the detection sound wave with a predetermined angle range with respect to the transmission direction.

The second apparatus transmitter 11b is configured to transmit detection sound waves to the outside of the parking stall 200. In the second apparatus transmitter 11b, a speaker is set so as to provide a transmission direction that extends towards a passage outside of the parking stall 200, by making the transmission direction form a predetermined angle against the transmission direction of the speaker in the first apparatus transmitter 11a.

The transmission direction of the speaker in the second apparatus transmitter 11b is however not limited thereto. Transmitting the detection sound waves to the outside of the parking stall 200 as referred to herein signifies that the detection sound wave is transmitted so as to provide a transmission direction having a predetermined angle range that covers at least an area of the passage outside of the parking stall 200.

As described above, the sound wave apparatus 10 of the second embodiment is configured to further include the second apparatus transmitter 11b in addition to the sound wave apparatus 10 of the first embodiment.

2-3. Effects

According to the second embodiment detailed above, the effects (1a) to (1d) of the first embodiment described above are provided; furthermore, the following effects are further provided.

(2a) In the sound wave apparatus 10, the apparatus transmitter 11 includes a first apparatus transmitter 11a and a second apparatus transmitter 11b. The first apparatus transmitter 11a is configured to transmit a detection sound wave into the inside of the parking stall 200. The second apparatus transmitter 11b is configured to transmit a detection sound wave to the outside of the parking stall 200.

According thereto, it is possible to reliably detect whether the parking stall 200 is in the empty state by the detection sound wave transmitted from the first apparatus transmitter 11a into the inside of the parking stall 200. Simultaneously, the detection sound wave transmitted from the second apparatus transmitter 11b towards the outside of the parking stall 200 allows the information terminal 20 held by the user 9 who is located outside the parking stall 200 and in the vicinity of the parking stall 200 to easily receive the position information.

2-4. Modification Example

In the sound wave apparatus 10 of the present embodiment, the second apparatus transmitter 11b may be configured to have a movable machine (not shown) to adjust the transmission direction of the detection sound wave.

3. Third Embodiment

3-1. Difference from First Embodiment

A third embodiment is different from the first embodiment in that the sound wave apparatus 10 generates position information representing the position of the sound wave apparatus 10 by latitude and longitude.

3-2. Configuration

In the third embodiment, the sound wave apparatus 10 is configured such that the position information unit 511 generates position information representing the position of the sound wave apparatus 10 by latitude and longitude. Similarly to the first embodiment, the state detection unit 512 detects whether the parking stall 200 where the sound wave apparatus 10 is installed is in the empty state.

In the third embodiment, the information terminal 20 is configured to receive at least the sound wave with the position information superimposed thereon, and acquires (extracts) the position information from the received sound wave. Further, the information terminal 20 displays an image representing the position information on the terminal display 22 based on the information indicating the position of the sound wave apparatus 10, that is, the position of the parking stall 200 included in the position information acquired from the received sound wave. Note that, in the present embodiment, the information terminal 20 does not need to have a configuration for storing the position information in the memory 42, but may optionally have a configuration for storing the position information in the memory 42.

Figure 9:
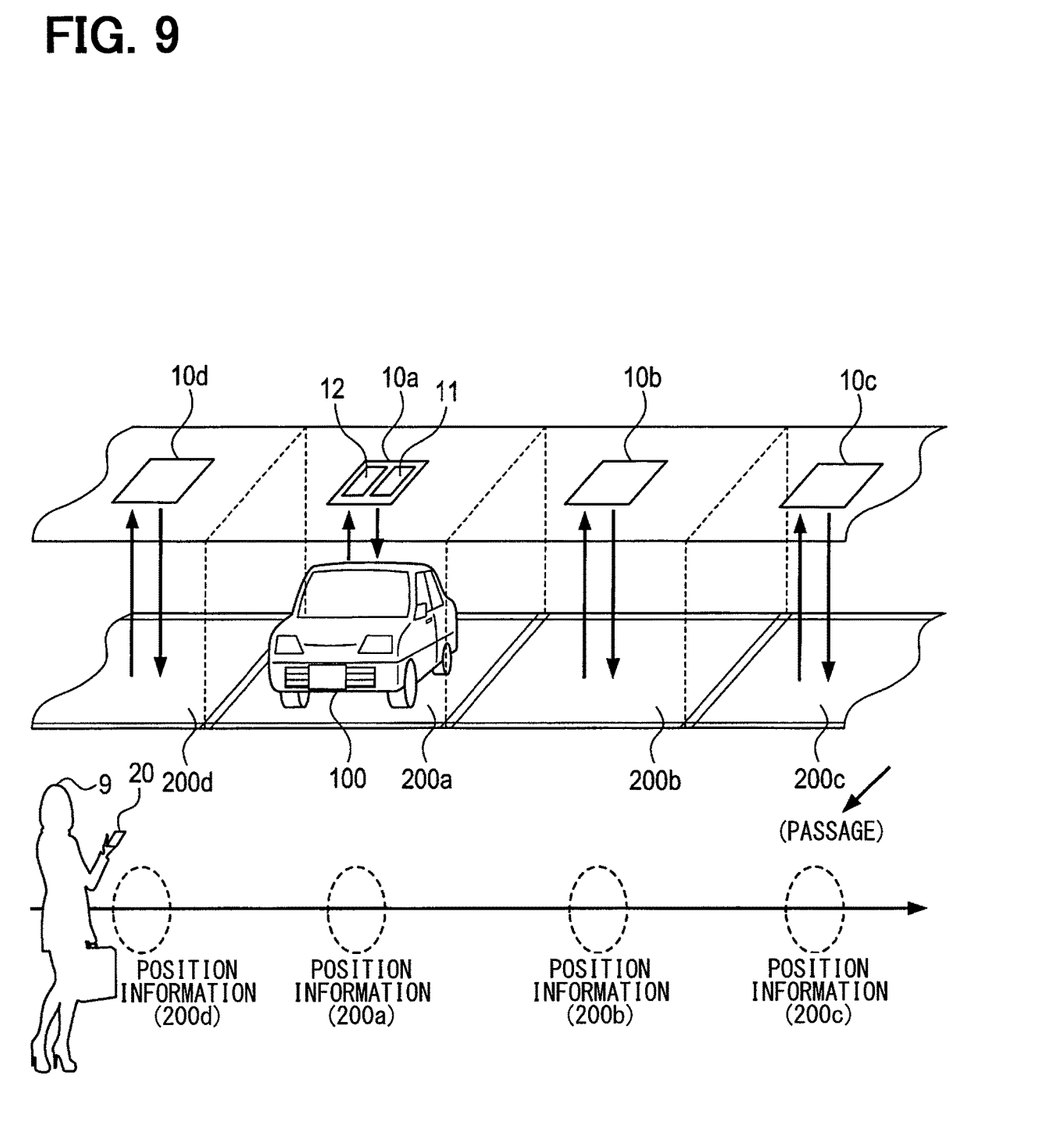
FIG. 9 is a diagram for explaining operations of a sound wave apparatus according to a third embodiment.

Under the above configuration, when the user 9 sequentially moves from the parking stall 200d to the parking stall 200c on the passage along the parking stalls 200, the information terminal 20 carried by the user 9 moves together with the movement of the user 9, as shown FIG. 9. Each time passing in front of each of the parking stalls 200 where the sound wave apparatuses 10 are installed, the information terminal 20 can acquire the position information in sequence based on the detection sound wave transmitted from each of the sound wave apparatuses 10 installed in the respective parking stalls 200.

That is, when the user 9 is located on the passage along the parking stall 200d, the information terminal 20 acquires the position information of the parking stall 200d from the sound wave apparatus 10d; when the user 9 is located on the passage along the parking stall 200a, the information terminal 20 acquires the position information of the parking stall 200a from the sound wave apparatus 10a; and when the user 9 is located on the passage along the parking stall 200c, the information terminal 20 acquires the position information of the parking stall 200c from the sound wave apparatus 10c, for instance. The position information is represented by latitude and longitude. The position information, that is, the latitude and longitude of the parking stall 200 is displayed on the terminal display 22.

Suppose cases that the user 9 moves inside of an area where GPS radio waves are difficult to reach such as a parking lot provided in an underground, or in the middle of a building or the like, for example. Even in such cases, by carrying the information terminal 20, it is possible to detect its own position based on the detection sound wave transmitted from the sound wave apparatus 10.

3-3. Effects

According to the third embodiment detailed above, the effects (1a) to (1d) of the above-described first embodiment are provided; furthermore, the following effects are provided.

(3a) The sound wave apparatus 10 transmits a sound wave that is received by the information terminal 20, the sound wave on which position information is superimposed. Specifically, in the sound wave apparatus 10, the position information unit 511 in the apparatus controller 15 acquires and stores information including the position of the sound wave apparatus 10 as position information. The apparatus transmitter 11 transmits the sound wave on which the position information is superimposed as a detection sound wave.

According thereto, for example, the use of latitude and longitude as information representing the position of the sound wave apparatus 10 allows the user 9 who is moving within the area where the GPS radio waves are difficult to reach such as an underground parking lot or a parking lot inside of a building to detect their own position by using the information terminal 20 based on the detection sound wave transmitted from the sound wave apparatus 10. Note that the position information is not limited to indicating the position of the sound wave apparatus 10 by latitude and longitude, but may represent the position of the sound wave apparatus 10 in various manners.

(3b) The apparatus transmitter 11 is configured to transmit a detection sound wave at least towards the inside of the parking stall 200. The apparatus receiver 12 receives the reflected wave of the detection sound wave. The state detection unit 512 in the apparatus controller 15 acquires the elapsed time which is a period of time from the transmission of the detection sound wave to the reception of the reflected wave, and detects that the designated area is in the empty state in response to that the elapsed time is equal to or greater than a predetermined time threshold value.

Here, suppose a case that a simple sound wave without position information superimposed thereon is transmitted towards the inside of the parking stall 200 from the sound wave apparatus 10. In such a case, the information terminal 20 cannot detect the position of the sound wave apparatus 10, that is, the position of the parking stall 200.

According the present embodiment, the sound wave apparatus 10 causes the information terminal 20 to detect the position of each of the parking stalls 200, and to detect whether or not each of the parking stalls 200 where the sound wave apparatuses 10 are installed is in the empty state.

(3c) The information terminal 20 is a detection sound wave, which is transmitted from the sound wave apparatus 10 installed in the predetermined parking stall 200 and on which position information including the position of the sound wave apparatus 10 is superimposed. The information terminal 20 includes a terminal receiver 21 and a terminal controller 24. The terminal receiver 21 receives the detection sound wave. The terminal controller 24 acquires (extracts) the position information superimposed on the received detection sound wave and stores the acquired position information in the memory as information indicating the position of the designated area.

According to the present embodiment, the information terminal 20 can easily detect the position of the own information terminal 20 based on the position information superimposed on the received detection sound wave.

4. Other Embodiments

Although the embodiments of the present disclosure have been described above, the present disclosure is not limited to the embodiments described above, and various modifications can be made to implement the present disclosure.

(4a) In the above embodiments, the parking stall 200 in the underground parking lot has been described as the designated area, but the designated area is not limited thereto. In addition to the parking stall 200 in the parking lot provided in the underground, the designated area may include a parking stall provided in an inside of the building. Further, for example, a parking area in which a parking meter on the road is installed, and the like may be included.

The sound wave apparatus 10 may be provided for a plurality of parking stalls 200, instead of being provided for each parking stall 200.

(4b) In the above-described embodiments, the sound wave apparatus 10 is installed at a spot upper than the information terminal 20, specifically on the ceiling, but is not limited thereto. For example, the sound wave apparatus 10 can be installed at a position such as a floor 202 in the parking stall 200 or a pillar or a wall that partitions the parking stalls 200. Not that it is preferable that the sound wave apparatus 10 is installed at a position where the reflected wave of the detection sound wave transmitted from the sound wave apparatus 10 can be easily obtained when the vehicle is present in the parking stall 200.

(4c) In the above-described embodiments, an inaudible sound wave of a dozen of kHz to several dozens of kHz is used as a detection sound wave. There is no need to be limited to the above frequency range. The detection sound wave may include (i) an inaudible sound wave having a frequency higher than the above frequency range and (ii) an audible sound wave having a frequency lower than the above frequency range.

(4d) The above-described embodiments describe an example in which the position detection system 1 includes a plurality of sound wave apparatuses 10a to 10b and one information terminal 20. There is no need to be limited thereto. The position detection system 1 may include at least one sound wave apparatus 10 and at least one information terminal 20. That is, a plurality of users 9 may acquire the position information by a plurality of information terminals 20 carried by the respective users 9.

(4e) The above-described embodiments describe an example in which the smartphone owned by the user 9 of the vehicle 100 parked in the parking stall 200 is used as the information terminal 20. There is no need to be limited thereto. The information terminal 20 may be configured to be carried by the user so as to receive the sound wave with the position information superimposed thereon, and acquire and store the position information.

Figure 10:
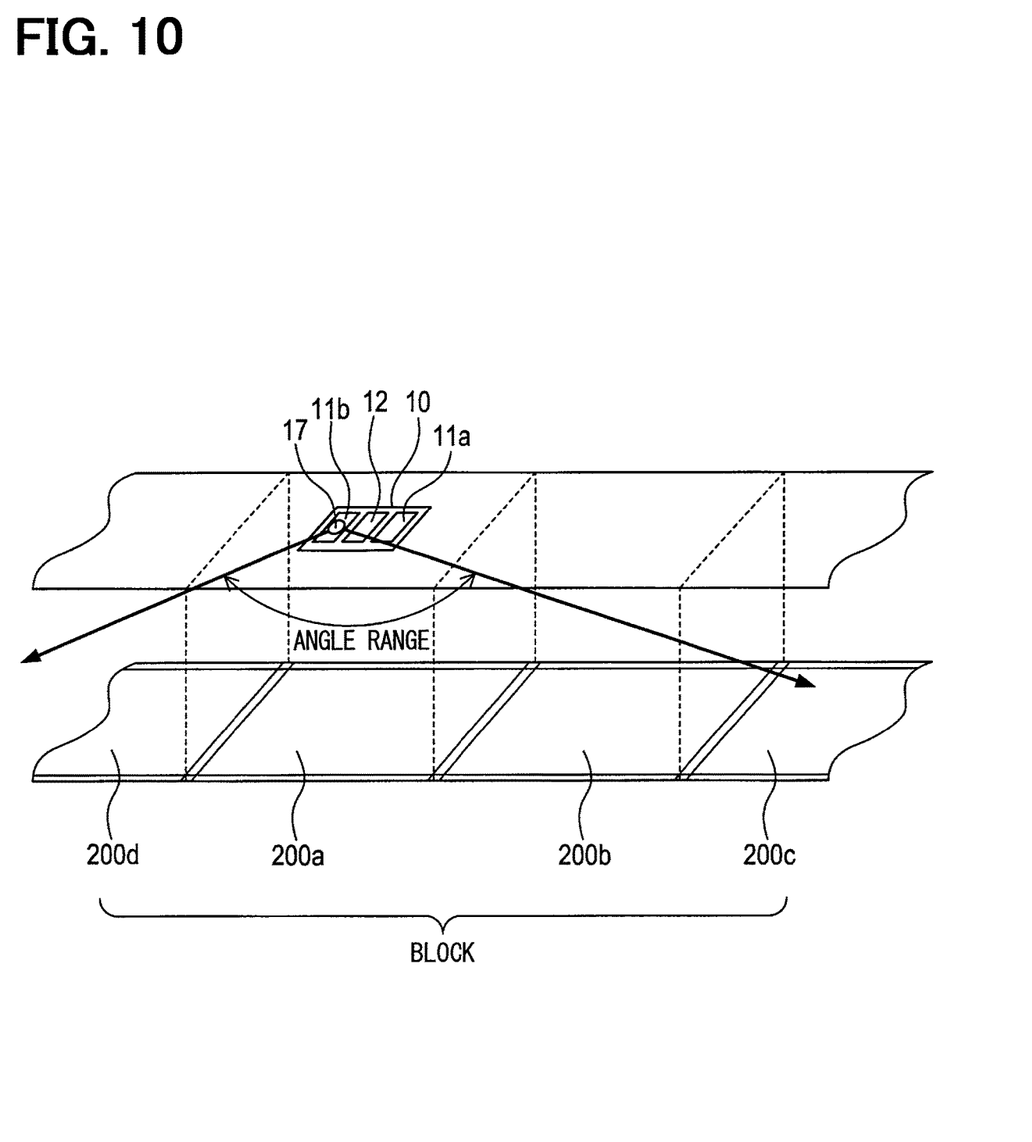
FIG. 10 is a diagram for explaining a sound wave apparatus according to another embodiment.

(4f) In the sound wave apparatus 10 of the second embodiment, the second apparatus transmitter 11b may be provided with a movable machine 17 as shown in FIG. 10; by moving the movable machine 17, the detection sound wave may be transmitted within a predetermined angle range. Specifically, the direction of the speaker of the second apparatus transmitter 11b may be changed by moving the movable machine 17. The movable machine 17 may be configured to be a well-known movable mechanism.

According thereto, the transmission direction of the detection sound wave may be set in a predetermined direction; the detection sound wave may be transmitted within a predetermined angle range.

Further, the range including a plurality of parking stalls 200 may be defined as an angle range referred to here. According thereto, for example, a plurality of parking stalls 200 such as parking stalls 200d, 200a, 200b, and 200c shown in FIG. 10 are grouped as one group (hereinafter referred to as a block). When the range including the block is set as an angle range described above, the detection sound wave may be transmitted for each block. That is, the information terminal 20 may detect the position of each block.

(4g) The present disclosure may be achieved as, in addition to a position detection system 1, a sound wave apparatus 10, an apparatus controller 15, an information terminal 20, a terminal controller 24, a program for causing an apparatus controller 15 and a terminal controller 24 to function, a non-transitory tangible storage medium such as a semiconductor memory storing the above program, a position detection method, and the like.

The apparatus transmitter 11 and the apparatus transmitters 11a and 11b each correspond to a sound wave transmitter or an apparatus sound wave transmitter; the apparatus receiver 12 corresponds to a sound wave receiver or an apparatus sound wave receiver; the apparatus controller 15 corresponds to an apparatus control unit, a position information unit (also referred to as a position information storage unit), and a state detection unit.

In addition, the information terminal 20 corresponds to a detection terminal; the terminal receiver 21 corresponds to a detection receiver or a terminal sound wave receiver; the terminal controller 24 corresponds to a detection controller, or a terminal control circuit; the terminal display 22 corresponds to a display; the memory 42 corresponds to a storage. S110 corresponds to a process as a position acquisition unit (or a position extraction unit); S120 corresponds to a process as a storage unit; and S130 corresponds to a process as a display instruction unit. Also, the parking stall 200 corresponds to a designated area.

Although the present disclosure has been described in accordance with the embodiments, it is understood that the present disclosure is not limited to the embodiments and configurations disclosed therein. The present disclosure is intended to cover various modification and equivalents. In addition, while the various elements are shown in various combinations or configurations, which are exemplary, other combinations or configurations, including more, less or only a single element, are also within the spirit and scope of the present disclosure.

It is noted that additional description relating to a configuration of a controller is made below. Although the above embodiments describe a configuration of a controller (i.e., the apparatus controller 15 and the terminal controller 24), another configuration of such a controller may be employed, as summarized below.

A controller, which may be also referred to as a control circuit or an electronic control unit, may further include an interface communicating with an external apparatus, a storage, and an internal communication line connecting the foregoing components to each other and may be combined with another controller.

Such a controller provides a plurality of functions and may include units (which may be also referred to as sections) to provide the respective functions. In addition, the flowcharts (described above) executed by a controller similarly include sections, e.g., each represented as S10 or S110. Such sections may be included in not only one controller but also may be divided to be included in two or more controllers (i.e., included in at least one controller). Several sections may be combined into a single section; one section may be divided into several sections. Each section may be also referred to or achieved as a processor, unit, device, module, or the like.

Furthermore, an individual one of the sections, processors, units or the like included in at least one controller, or an individual controller of the at least one controller may be achieved by using or by including (i) at least one hardware circuit including analog circuit and/or digital circuit, or (ii) at least one processing unit such as a CPU in a computer along with memory storing instructions as a non-transitory tangible computer-readable storage medium storing instructions of program executed by the CPU, or (iii) a combination of the at least one hardware circuit and the at least one processing unit along with memory storing instruction, to thereby provide the functions.

For reference to further explain features of the present disclosure, a comparative technique is described as follows. There is known a technique for detecting a position using a GPS (Global Positioning System); however, it is difficult to use GPS, for example, underground, indoors, and the like. In such a place where it is difficult to use the GPS, there are proposed various techniques for detecting the position.

For example, a technique is proposed which requires a terminal held by a user to read a contactless tag installed in a parking lot for detecting information indicating the parking position stored in the contactless tag.

Such a technique however requires the user to hold the terminal over the contactless tag in order to detect the parking position; thus detection of the parking position may be time-consuming.

It is required to provide a technique for allowing a user to easily detect a position.

Aspects of the disclosure described herein are set forth in the following clauses.

According to a first aspect of the present disclosure, a position detection system is provided as including a sound wave apparatus and a detection terminal. The sound wave apparatus is provided in a predetermined designated area, and includes a position information unit and a sound wave transmitter. The position information unit acquires (stores) position information which is information including a position of the sound wave apparatus. The sound wave transmitter transmits a sound wave on which the position information is superimposed as a detection sound wave. The detection terminal includes a detection receiver, a position acquisition unit, and a storage unit. The detection receiver receives the detection sound wave. The position acquisition unit acquires (extracts) the position information superimposed on the received detection sound wave. The storage unit stores the acquired (extracted) position information in a memory as information indicating the position of the designated area.

With such a configuration of the first aspect, the sound wave apparatus installed in a designated area transmits the detection sound wave superimposed with the position information, while the detection terminal receives the detection sound wave, acquires the position information, and stores the position information as information indicating the position of the designated area.

This configuration allows the user to easily detect the position of the designated area by using the detection terminal without needing a troublesome work of the user such as holing a terminal over the contactless tag as in the conventional technique.

According to a second aspect of the present disclosure, a position detection system is provided as including (i) a sound wave apparatus provided in a predetermined designated area and (ii) a detection terminal. The sound wave apparatus includes an apparatus controller configured to acquire position information including a position of the sound wave apparatus; and an apparatus sound wave transmitter connected with the apparatus controller and configured to transmit a detection sound wave that is a sound wave on which the position information acquired by the apparatus controller is superimposed. The detection terminal includes a terminal sound wave receiver configured to receive the detection sound wave; and a terminal controller connected with the terminal sound wave receiver and configured to acquire the position information superimposed on the detection sound wave received by the terminal sound wave receiver, and to store, in a memory, the acquired position information as information indicating the position of the designated area.

With such a configuration of the second aspect, effects similar to those by the first aspect may be provided.

Further, according to an optional aspect of the second aspect, the position detection system may be provided as follows. That is, each of the apparatus controller and the terminal controller may be configured by using at least one processor, an individual processor of the at least one processor being configured to include (i) at least one hardware circuit including a digital circuit and/or analog circuit, or (ii) at least one central processing unit along with memory storing instructions, or (iii) a combination of (a) the at least one hardware circuit and (b) the at least one central processing unit along with memory.

What is claimed is:

1. A position detection system comprising (i) a sound wave apparatus provided in a predetermined designated area and (ii) a detection terminal,
the sound wave apparatus comprising:
an apparatus controller configured to acquire position information including a position of the sound wave apparatus; and
an apparatus sound wave transmitter connected with the apparatus controller, the apparatus sound wave transmitter being configured to transmit a detection sound wave that is a sound wave on which the position information acquired by the apparatus controller is superimposed,
the detection terminal comprising:
a terminal sound wave receiver configured to receive the detection sound wave; and
a terminal controller connected with the terminal sound wave receiver, the terminal controller being configured
to acquire the position information superimposed on the detection sound wave received by the terminal sound wave receiver, and
to store, in a memory, the acquired position information as information indicating the position of the designated area.

2. The position detection system according to claim 1, wherein the apparatus sound wave transmitter in the sound wave apparatus is configured to transmit the detection sound wave towards at least inside of the designated area,
the sound wave apparatus is further comprises
an apparatus sound wave receiver connected with the apparatus controller, the apparatus sound wave receiver being configured to receive a reflected wave of the detection sound wave, and
wherein the apparatus controller is further configured
to acquire an elapsed time from when the detection sound wave is transmitted by the apparatus sound wave transmitter to when the reflected wave is received by the apparatus sound wave receiver, and
to determine that the designated area is in an empty state in response to that the elapsed time is equal to or greater than a predetermined threshold value.

3. The position detection system according to claim 1, wherein
the apparatus sound wave transmitter in the sound wave apparatus comprises a first apparatus transmitter and a second apparatus transmitter,
the first apparatus transmitter being configured to transmit the detection sound wave towards inside of the designated area,
the second apparatus transmitter being configured to transmit the detection sound wave towards outside of the designated area.

4. The position detection system according to claim 3, wherein
the second apparatus transmitter is configured to transmit the detection sound wave within a predetermined angle range by moving a movable machine.

5. The position detection system according to claim 1, wherein
the terminal controller is further configured to instruct a display to display an image representing the position information.

6. The position detection system according to claim 1, wherein
the detection terminal is configured to be carried by a user who uses the detection terminal.

7. The position detection system according to claim 1, wherein
each of the apparatus controller and the terminal controller is configured by using at least one processor,
an individual processor of the at least one processor being configured to include
(i) at least one hardware circuit, or
(ii) at least one central processing unit along with memory storing instructions, or
(iii) a combination of (a) the at least one hardware circuit and (b) the at least one central processing unit along with memory.

8. A sound wave apparatus provided in a predetermined designated area, comprising:
an apparatus controller configured to acquire position information including a position of the sound wave apparatus; and
an apparatus sound wave transmitter connected with the apparatus controller, the apparatus sound wave transmitter being configured to transmit a detection sound wave that is a sound wave, which the position information acquired by the apparatus controller is superimposed on, to be received by a detection terminal.

9. The sound wave apparatus according to claim 8, wherein
the apparatus sound wave transmitter in the sound wave apparatus is configured to transmit the detection sound wave towards at least inside of the designated area,
the sound wave apparatus further comprising:
an apparatus sound wave receiver connected with the apparatus controller, the apparatus sound wave receiver being configured to receive a reflected wave of the detection sound wave,
wherein the apparatus controller is further configured
to acquire an elapsed time from when the detection sound wave is transmitted by the apparatus sound wave transmitter to when the reflected wave is received, by the apparatus sound wave receiver and
to determine that the designated area is in an empty state in response to that the elapsed time is equal to or greater than a predetermined threshold value.

10. A detection terminal comprising:
a terminal sound wave receiver configured to receive a detection sound wave transmitted from a sound wave apparatus provided in a predetermined designated area, the detection sound wave on which position information including a position of the sound wave apparatus is superimposed; and
a terminal controller connected with the terminal sound wave receiver, the terminal controller being configured
to acquire the position information superimposed on the detection sound wave received by the terminal sound wave receiver, and
to store the acquired position information in a memory as information indicating the position of the designated area.

* * * * *